United States Patent [19]
Thaler et al.

[11] Patent Number: 5,726,445
[45] Date of Patent: Mar. 10, 1998

[54] DEVICE FOR OBTAINING HARMONIC-FREE SIGNALS

[75] Inventors: Josef Thaler, Traunreut; Hermann Meyer, Weissbach, both of Germany

[73] Assignee: Dr. Johannes Heidenhain GmbH, Traunreut, Germany

[21] Appl. No.: 669,008

[22] Filed: Jun. 21, 1996

[30] Foreign Application Priority Data

Jun. 22, 1995 [EP] European Pat. Off. ............. 95109701

[51] Int. Cl.$^6$ ..................................... H01J 3/14
[52] U.S. Cl. ........................ 250/237 G; 250/231.16
[58] Field of Search ...................... 250/237 G, 231.16, 250/227.11, 559.29, 550; 356/334, 395

[56] References Cited

U.S. PATENT DOCUMENTS

| | | |
|---|---|---|
| 3,674,372 | 7/1972 | Weyrauch . |
| 4,595,991 | 6/1986 | Spies . |
| 4,602,436 | 7/1986 | Ernst . |
| 4,782,229 | 11/1988 | Ernst . |
| 4,818,939 | 4/1989 | Takahashi et al. . |
| 5,332,896 | 7/1994 | Holzapfel . |

FOREIGN PATENT DOCUMENTS

| | | |
|---|---|---|
| 0 235 750 | 9/1987 | European Pat. Off. . |
| 0 250 711 | 1/1988 | European Pat. Off. . |
| 1 941 731 | 11/1973 | Germany . |
| 33 05 921 | 9/1983 | Germany . |
| 32 39 108 | 4/1984 | Germany . |
| 34 12 128 | 5/1985 | Germany . |
| 1 227 942 | 4/1971 | United Kingdom . |
| 2116313 | 9/1983 | United Kingdom . |

Primary Examiner—Stephone B. Allen
Attorney, Agent, or Firm—Brinks Hofer Gilson & Lione

[57] ABSTRACT

A scanning graduation that scans a scale along a measuring direction to produce a signal representative of a position measurement value. The scanning graduation includes a particular transmission function which generates a filtering function when scanning the scale, wherein the transmission function is determined by a quantity of harmonics to be suppressed in the signal. The scanning graduation includes at least one scanning element for scanning a graduation period of the scale. The at least one scanning elements have at least one track comprised of N sub-elements, which are offset from one another in a measurement direction within a graduation period of the scanning graduation and whose effective widths $b_i$ ($i=1$ to N) within the graduation period are matched to their position within the graduation period so that the Fourier coefficients of the transmission function associated with the harmonics to be suppressed are minimized.

30 Claims, 4 Drawing Sheets

DEVICE FOR OBTAINING HARMONIC-FREE SIGNALS

Applicants claim, under 35 U.S.C. §119, the benefit of priority of the filing date of Jun. 22, 1995, of a European application, Ser. No. 95109701, filed on the aforementioned date, the entire contents of which are incorporated herein by reference.

FIELD OF THE INVENTION

The invention relates to a device for obtaining harmonic-free signals, which is suited for measuring position changes of two objects that move in relation to each other.

BACKGROUND OF THE INVENTION

A wide variety of physical scanning principals are used inside devices of this kind. It is necessary to distinguish between photoelectric, magnetic, inductive, and capacitive scanning processes. However, the basic principle of all methods is the same: a periodic graduation is scanned and the periodic amplitude-modulated scanning signal generated in this way is evaluated as a measurement signal.

The period of the scanning signal obtained is determined by the graduation period or the increment of graduation of the graduation carrier. In photoelectric measuring devices, the increment is constituted by the width of a transparent strip and the width of an opaque strip in the measurement direction. With the relative movement between the scanning unit and the graduation of the graduation carrier, a counting pulse is derived from each scanned increment, added using correct signs, and the sum is available as an incremental measurement value.

At the present time, periodic analog signals obtained from the graduations of the graduation carrier in photoelectric, magnetic, inductive, and capacitive measuring devices do not generally have a purely sine-shaped curve, but are encumbered with harmonics particularly as a result of imprecisions of the graduations. These kinds of graduation imprecisions are caused for example by varying spacings of the transparent and opaque strips or by these strips having edges which are not sharp for technical manufacturing reasons. To obtain exact position measurement values within each graduation period or to further increase resolution by obtaining interpolation values within graduation periods, the analog signal obtained in this way should be free of harmonics, that is, should be as sine-shaped as possible, for example. Therefore, high demands are placed on the precision of graduations.

Currently, there are already many known solutions for eliminating undesired harmonic signal content.

DE 33 05 921 discloses particular means in the form of an optical scanning element with a sine-shaped, varying characteristic transmission curve, with which the harmonic content can be minimized.

GB 1 227 942 discloses that it is also possible to eliminate the influence of higher magnitude harmonics by means of additional apertures and varying reciprocal spacings of the scanning gaps.

EP 0 235 750 describes the elimination of harmonic content of the third magnitude inside a magnetic measuring system. To this end, magnetoresistive sensor elements are combined in pairs where the distances between the members of each pair and between each pair and the next are suitably chosen with regard to the elimination of the third harmonic.

EPA 0 250 711 proposes dividing a detector system into a number of sub-fields to obtain scanning signals that are free of harmonics up to a predetermined band width. The individual detector sub-fields are dimensioned with regard to their widths and shapes, as well as in reciprocal positional reference to each other and are disposed distributed over a number of graduation periods of the graduation so that harmonics of a predetermined band width are eliminated from the signal.

To obtain harmonic-free periodic signals, DE 32 39 108 proposes first determining the band width of the analog signal in order to determine the number of scanning elements required. The periodic analog signals supplied by the scanning elements undergo a Fourier analysis to determine Fourier coefficients of the fundamental wave of the analog signal. Finally, the Fourier coefficients of the fundamental wave which are obtained in this way are evaluated further as harmonic-free periodic signals for obtaining position measurement values.

DE 34 12 128 discloses a mathematically equivalent solution, but is a different embodiment for harmonic filtering which is known as a so-called inverse sine scanning, in which the scanning grid has a number of scanning fields, which are distributed in relation to one another in the measurement direction in accordance with an inverse sine function (arcsin). It is disadvantageous here that the ideal distribution of the inverse sine scanning varies as a function of the total number of lines, i.e. depending upon the width of the scanning window DE 19 41 731 discloses a photoelectric length measuring device in which a frequency filter aperture with a sine-shaped transmission curve is inserted into the measurement system to obtain a harmonic-free analog signal when scanning the graduation of a graduation carrier. Furthermore, the suggested frequency filter apertures can also be mounted directly on the scanning grid. Therefore, a particular frequency filter aperture has to be manufactured and installed inside the proposed device. Furthermore, this measuring device is limited to the photoelectric principle of transmitted light measurement.

If a graduation is to be scanned in which the magnitude of the graduation period is approximately identical to the measurements of the detector elements in the measurement direction, then the proposed solutions for eliminating harmonics turn out not to be optimum or suitable. For example, when the scanning plate is embodied according to DE 33 05 921, the result is an insufficient signal intensity on the detector end since the whole detector surface is not used. The use of a scanning structure with scanning windows, which according to DE 34 12 128 are distributed in accordance with an inverse sine function, is only possible if a number of graduation periods of the graduation can be detected with it and in this way, a signal averaging is achieved.

Therefore, an object of the present invention is to make a device for obtaining substantially harmonic-free signals in the scanning of a periodic graduation, in which the graduation period of the graduation is approximately on the order of magnitude of the extension of the detector elements in the measurement direction. If possible, no additional elements should be required for this purpose, a sufficient signal intensity on the detector end should result, and adequate adjustment tolerances should be assured.

SUMMARY OF THE INVENTION

The present invention concerns a device for obtaining substantially harmonic-free signals which are produced by scanning a periodic graduation with a scanning graduation.

The device has a scanning graduation having a particular transmission function which generates a filtering function when scanning the periodic graduation, wherein the transmission function is determined by a quantity of harmonics to be suppressed in the signals. The scanning graduation includes at least one scanning element for scanning a graduation period of the scanning graduation the at least one scanning elements have at least one track comprised of N sub-elements, which are offset from one another in a measurement direction within a graduation period of the scanning graduation and whose effective widths $b_i$ (i=1 to N) within the graduation period are matched to their position within the graduation period so that the Fourier coefficients of the transmission function associated with the harmonics to be suppressed are minimized.

Another aspect of the present invention involves a position measuring device for obtaining a position measurement value. The device has a light source producing a light flux and a scale with a first graduation that receives the light flux and allows the light flux to pass therethrough. A scanning unit is employed that has a second graduation that receives the light flux passing through the first graduation of the scale and allows the received light flux to pass therethrough, wherein the scanning unit moves relative to the scale along a measurement direction. A photodetector then receives the light flux passing through the second graduation and producing a signal therefrom representative of the position measurement value. The second graduation has a particular transmission function which generates a filtering function when scanning the first graduation, wherein the transmission function is determined by a quantity of harmonics to be suppressed in the signals. The second graduation comprising at least one scanning element for scanning a graduation period of the first graduation. In addition, the at least one scanning elements have at least one track with N sub-elements, which are offset from one another in a measurement direction within a graduation period of the scanning graduation and whose effective widths $b_i$ (i=1 to N) within the graduation period are matched to their position within the graduation period so that the Fourier coefficients of the transmission function associated with the harmonics to be suppressed are minimized.

A third aspect of the present invention involves a scanning graduation that scans a scale along a measuring direction to produce a signal representative of a position measurement value. The scanning graduation includes a particular transmission function which generates a filtering function when scanning the scale, wherein the transmission function is determined by a quantity of harmonics to be suppressed in the signal. The scanning graduation includes at least one scanning element for scanning a graduation period of the scale. The at least one scanning elements have at least one track comprised of N sub-elements, which are offset from one another in a measurement direction within a graduation period of the scanning graduation and whose effective widths $b_i$ (i=1 to N) within the graduation period are matched to their position within the graduation period so that the Fourier coefficients of the transmission function associated with the harmonics to be suppressed are minimized.

The advantages achieved with each of the above aspects of the invention are particularly comprised in that it permits the obtaining of harmonic-free periodic signals in a simple manner, with only modified conventional means of known position measuring devices, without requiring additional elements such as frequency filter apertures. Therefore no excessive demands have to be placed on the precision of the graduation. Furthermore, the devices according to the inventions are highly efficient.

Advantageous further features of the invention will become apparent from the ensuing detailed description of exemplary embodiments of the invention, taken in conjunction with the drawings.

DESCRIPTION OF THE PREFERRED EMBODIMENTS

Figure 1:
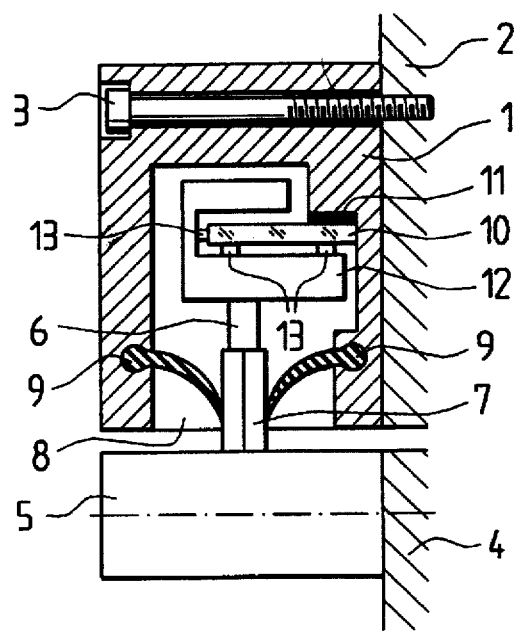
FIG. 1 shows a length measuring device in cross section.

FIG. 1 shows a cross section through a possible design of a length measuring device embodied according to the invention, whose housing 1 in the form of a hollow profile is attached by means of a screw connection to a bed 2 of a processing machine, not shown. A mounting foot 5 fastened in an arbitrary manner to a carriage 4 of the processing machine has a carrier 6 that protrudes with a knife-shaped taper 7 through a slot 8 into housing 1 that is otherwise completely closed; elastic sealing lips 9 provided in the slot 8 prevent impurities from penetrating into the interior of the housing 1. A scale 10 is affixed to an inner face of the housing 1 by means of an elastic adhesive layer 11 and a scanning unit 12 is supported via rollers 13 against this scale 10; the relative movement of the carriage 4 in relation to the bed 2 is transmitted from the carrier 6 to the scanning unit 12.

Alternative to the embodiment according to FIG. 1, the present invention can naturally also be realized in a rotary device, i.e. for example an angle measuring device.

Figure 2:
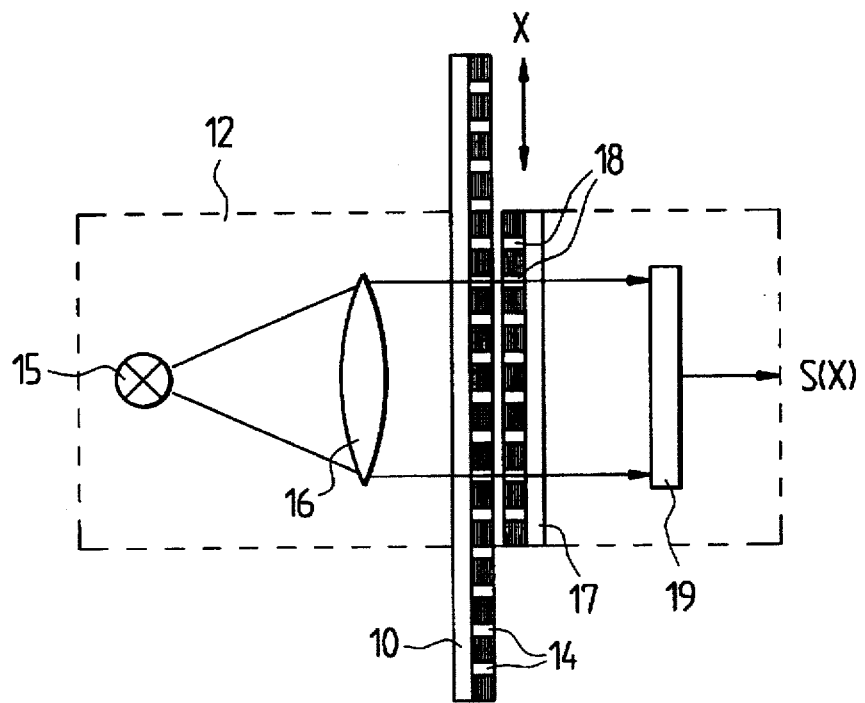
FIG. 2 is a schematic representation of the scanning unit of a photoelectric length measuring device.

According to FIG. 2, a light source 15, a condenser 16, a scanning plate 17 with a graduation 18, and a detector element in the form of a photodetector, such as photovoltaic cell 19, are disposed in the scanning unit 12 to scan a graduation 14 of the scale 10. The light flux coming from the light source 15 is directed parallel by the condenser 16, passes through the graduations 14, 18 of the scale 10 and the scanning plate 17 and finally strikes the photovoltaic cell 19. When the scanning unit 12 with the scanning plate 17 moves in the measurement direction X in relation to the scale 10, the light flux at the graduations 14, 18 is modulated so that the photovoltaic cell 19 supplies a periodic electrical analog signal S (X), which is evaluated, counted, and reutilized in digital form as a position measurement value.

The periodic analog signal S (X) supplied by the photovoltaic cell 19 is generally encumbered with harmonics for example due to imprecisions of the graduations 14, 18, and can be represented as a function of the measurement path X by means of a Fourier series.

Figure 3:
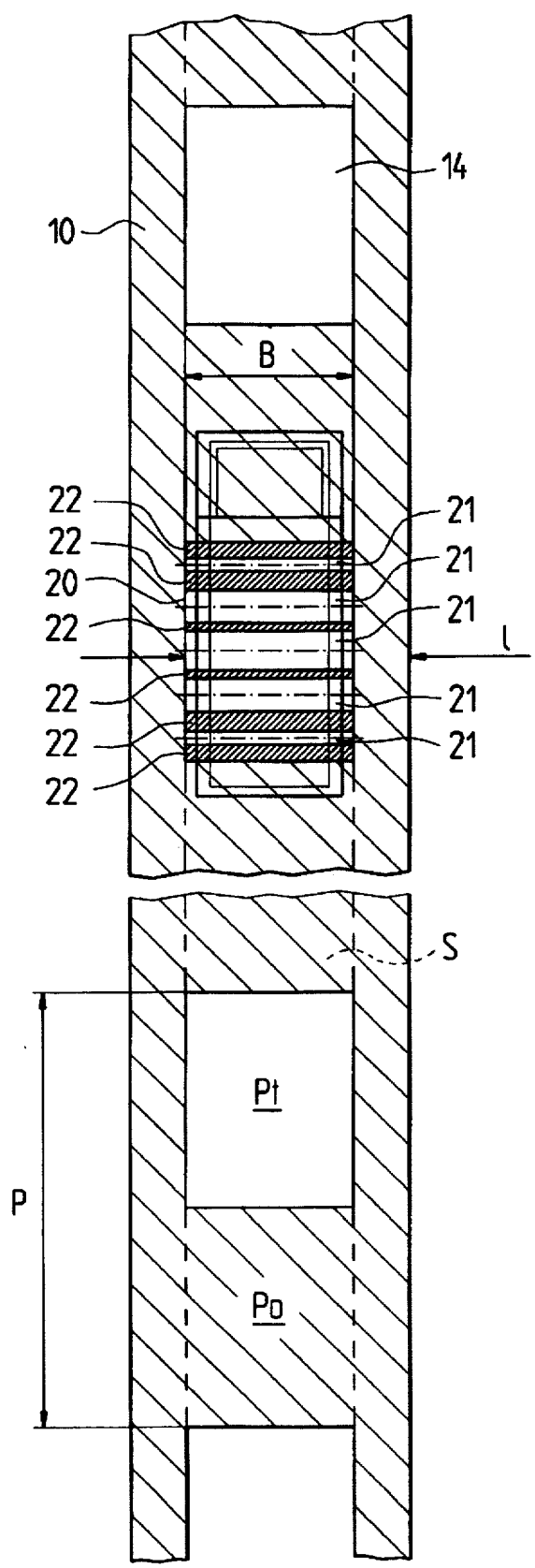
FIG. 3 shows a possible embodiment of the scale and the scanning element according to the invention.

The scale 10 shown enlarged in FIG. 3 has the graduation 14 with a graduation period P, which is composed of two halves: a transparent region $P_t$ and an opaque region $P_o$. Only a single scanning element 20 of the scanning unit 12 for scanning the graduation 14 is represented in this depiction. In this case, the scanning element 20 includes the scanning plate 17 and the photovoltaic cell 19 from FIG. 2. There are many possibilities with regard to the embodiment of the scanning element 20. Thus, the scanning element 20 can be comprised of a scanning plate 17, which has a scanning graduation 18 and the photovoltaic cell 19; however, it is also possible to alternatively embody the scanning element so that the scanning graduation 18 is impressed directly on the photovoltaic cell 19. Since there are therefore many embodiments, in general, this part will be simply referred to below as a scanning element 20.

In the device according to the invention, in the measurement direction X, the scanning element 20 has the length of half the graduation period P of the graduation 14, i.e. in its dimensions, particularly in the measurement direction, the scanning element approximately corresponds to the magnitude of the graduation period P of the graduation 14.

Figure 5:
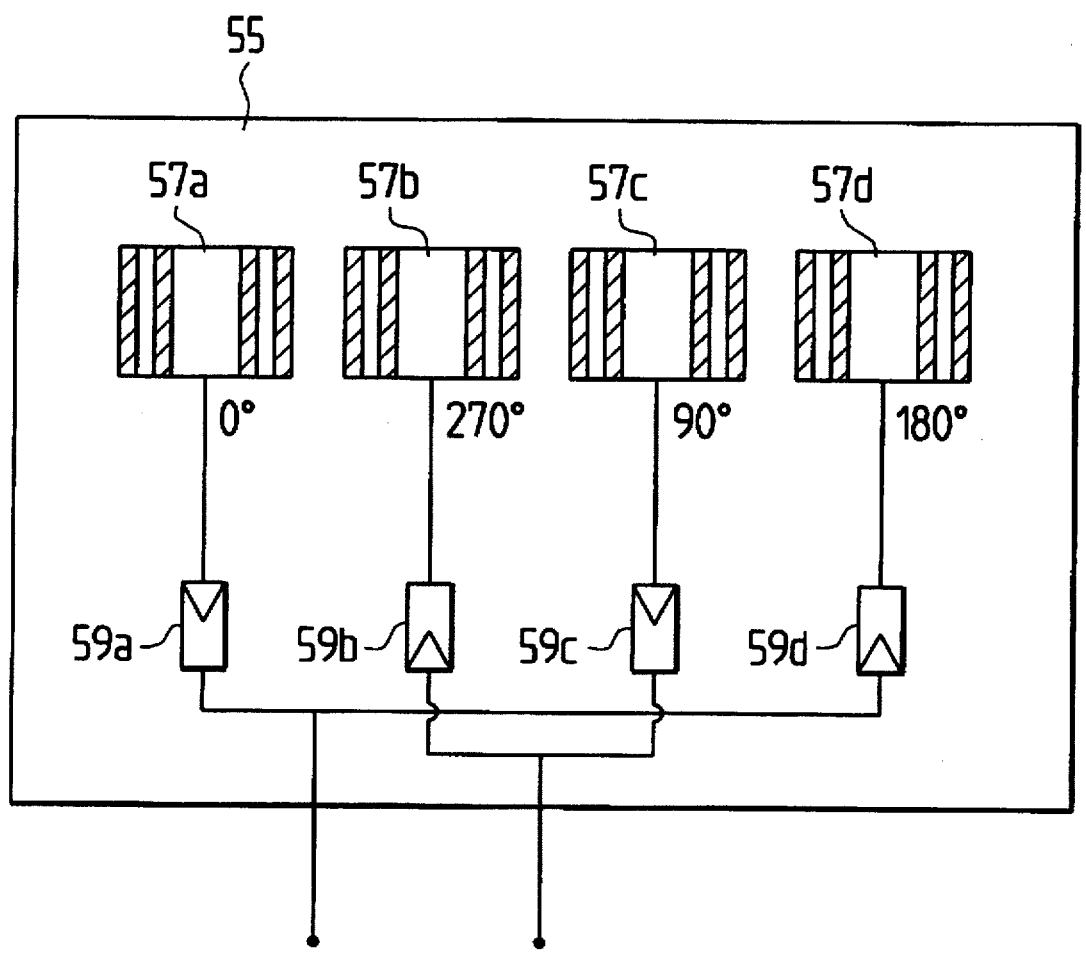
FIG. 5 is a schematic representation of a possible embodiment of the scanning unit, including the provided connection of the detector elements.

Naturally, a number of scanning elements 20 embodied in this way can be disposed in series in the measurement direction X inside the position measuring device according to the invention, which in turn depends upon the desired evaluation of the photodetector signals. FIG. 5 below should be noted with regard to an embodiment of this kind and the associated connection.

The scanning element 20 is comprised of sub-elements 21 that are embodied as transparent regions and are separated from one another by opaque regions 22. The number N of transparent sub-elements 21 depends on the desired quality of the optimally sine-shaped signals, i.e. it depends on the required degree of freedom from harmonics. In a practical sense, this means that there is a direct correlation between the ordinal number of the harmonics to be filtered out, therefore consequently the degree to which the signal is sine-shaped, and the number N of transparent sub-elements 21.

According to the invention, the width $b_i$ (i=1 to N) of the transparent sub-elements 21, depending on their length, varies within the graduation period P in accordance with a sine or cosine function in order to assure the desired elimination of harmonic contents. A function suited for this will be disclosed below.

Figure 4:
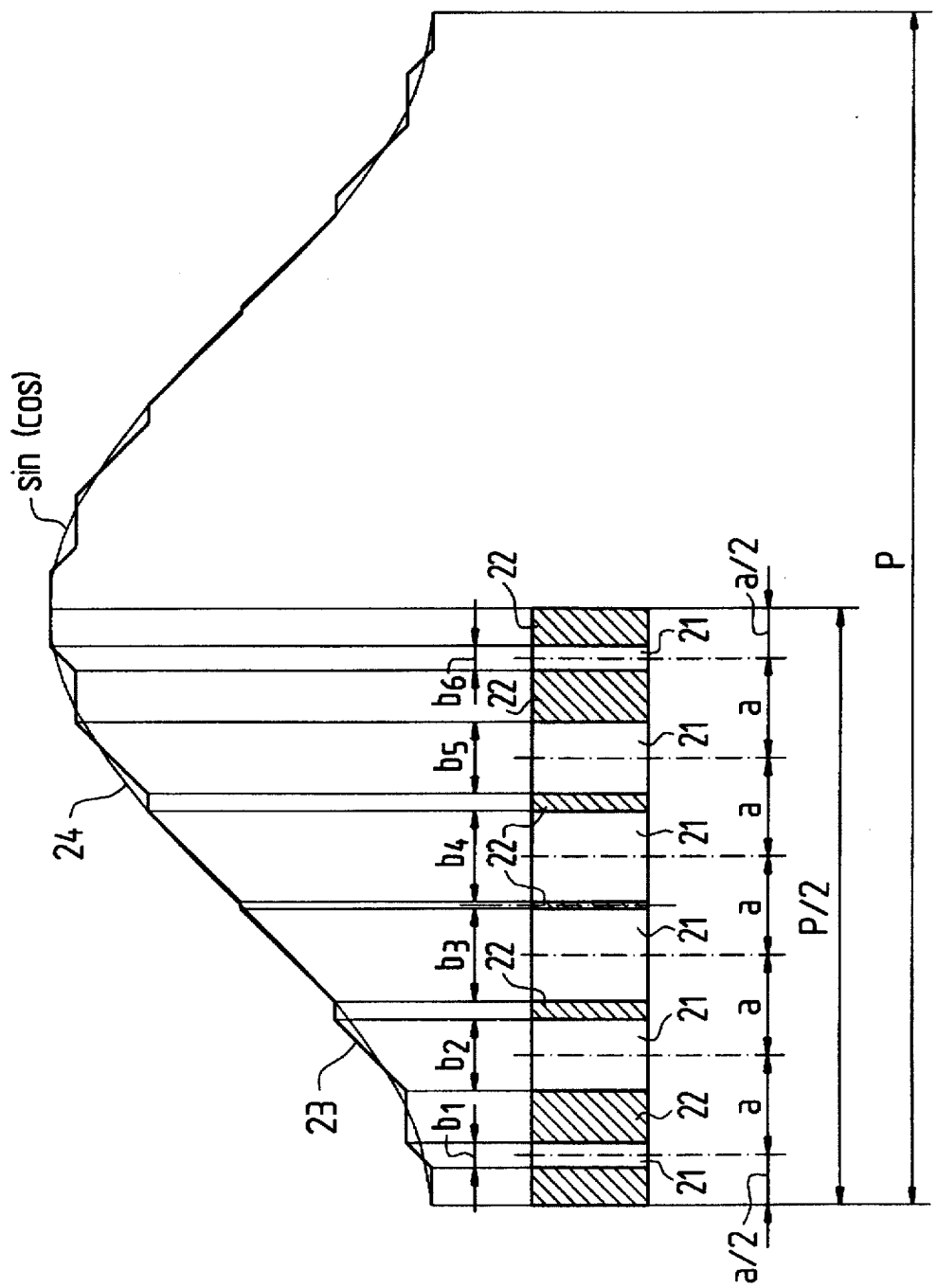
FIG. 4 shows a scanning element embodied according to the invention, with the resulting scanning signal.

FIG. 4 shows an enlarged representation of a scanning element 20 embodied according to the invention and plotted above it, the signal 23 obtained by the scanning element 20 and the envelope 24 of this signal. In the measuring direction X, the exemplary embodiment of the scanning element 20 shown here has a length that corresponds to half of the graduation period P of the graduation. The widths $b_i$ of the transparent sub-elements 21 of the scanning element 21 are chosen to vary within this region.

In the embodiment shown, the centers of the sub-elements 21 are disposed spaced apart from one another by the same distance, which the measuring arrows a should clearly indicate.

As shown in this representation, the width $b_i$ (i=1 to N) of the sub-elements 21 varies and in the embodiment shown, varies in accordance with a sine function, depending upon the position of the individual sub-element 21 within the graduation period P. Starting from the left, therefore, the width $b_i$ increases to a maximum width and becomes narrower again toward the right.

The sub-elements do not have to be disposed equidistant to each other as shown in the embodiment; their reciprocal spacings can also vary. For technical manufacturing reasons, though, an even spacing a between the centers of the sub-elements $b_i$ has turned out to be advantageous. The correlations between the width $b_i$ of the sub-elements 21 and their position or disposition within a graduation period P will be gone into in further detail below.

In order to receive a large amount of radiant energy on the detector element or the photodetector, the sub-elements 21 are embodied as rectangular and, perpendicular to the measurement direction X, are embodied of such a length that they correspond to the width B of the graduation 14. This signifies a higher achievable signal intensity or light efficiency in comparison to the known embodiments if the scanning element includes, for example, a scanning window with a sine-shaped contour, as has been suggested in DE 33 05 921.

With the invention, since the same width of graduation 14 is always scanned by the sub-elements 21, it is always possible to achieve the maximum light efficiency in this regard.

As already indicated, the embodiment of the scanning element according to the invention is particularly advantageous in measuring devices whose graduation 14 has a graduation period P, which has the same magnitude as the dimensions or measurements of the receiving face of the photodetector, for example on the order of several tenths of a mm.

In a provided number N of sub-elements 21, according to the invention, the width $b_i$ (i=1 ... N) of the individual sub-elements 21 within a graduation period P is yielded in accordance with the following equation (1), wherein the center distances a of the sub-elements 21 are chosen according to equation (2):

$$b_i = a * \sin(i * 180°/N - 90°/N) \quad (1)$$

$$a = P/(2 * N) \quad (2)$$

As already indicated, according to the invention, a number of scanning elements can also be disposed in series in the measurement direction X, which supply defined, phase-shifted partial output signals. The partial output signals supplied by the different scanning elements can be combined here in a large variety of ways for further processing, which is explained in more detail in conjunction with an exemplary embodiment in FIG. 5.

If the reciprocal spacing of the sub-elements is not chosen as equidistant, the filtering of arbitrary harmonics and even sub-harmonics can be carried out by means of a particular distribution of sub-elements within a graduation period.

The filtering function for the scanning signals, which is to be achieved by the scanning graduation, is characterized by a particular transmission function of the scanning graduation, which is determined by the harmonics to be filtered out. The undesirable harmonics are suppressed when their associated Fourier coefficients in the transmission function of the scanning graduation are suppressed or minimized. In order to achieve this function, the widths of the sub-elements 21 and their position within a graduation period are matched to each other according to the regularities explained.

As the exemplary embodiment in FIG. 4 shows, the embodiment of the scanning elements according to the invention, i.e. the width and position of the sub-elements 21, produces a resultant output signal shape that is essentially sine-shaped and free of harmonics. The output signal shape therefore corresponds approximately to the envelope 24 shown in FIG. 4.

FIG. 5 shows a schematic representation of a part of another embodiment of the position measuring device according to the invention, in particular, the scanning unit 55. The scanning unit 55, which is used for scanning a graduation not shown, includes four separate scanning plates or scanning graduations 57a–57d here. The four scanning graduations 57a–57d are in turn embodied according to the invention, i.e. the widths of the transparent sub-elements are embodied variously within a graduation period P of the graduation, as explained at the beginning, that is, with widths that vary in accordance with a sine shape and constant center spacings, for example. In the schematic representation in FIG. 5, three transparent sub-elements have been indicated inside the scanning graduations. The relative disposition of the four scanning graduations 57a–57d to each other is embodied here in such a way that upon scanning a graduation, phase-shifted output signals are produced, which can be associated with the different scanning graduations. The phase shift of the output signals of the different scanning graduations 57a–57d are chosen so that starting from the left, the first scanning graduation 57a supplies the 0° signal, the second supplies the 270° signal, the third supplies the 90° signal, and the fourth supplies the 180° signal.

Each of the scanning graduations embodied in this manner is associated with corresponding photodetectors, such as photovoltaic cells 59a–59d, where the photovoltaic cells 59a and 59d associated with the first and the fourth scanning graduations are connected in antiparallel, as are the photovoltaic cells 59b and 59c associated with the second and third scanning graduations. On the output end, the result is two signals which are phase-shifted by 90° and are to a large extent free of harmonics due to the embodiment of the scanning elements according to the invention. The further processing of the two output signals is carried out in a known manner.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A device for obtaining substantially harmonic-free signals which are produced by scanning a periodic graduation with a scanning graduation, said device comprising:

said scanning graduation comprising a particular transmission function which generates a filtering function when scanning said periodic graduation, wherein said transmission function is determined by a quantity of harmonics to be suppressed in said signals;

said scanning graduation comprising at least one scanning element for scanning a graduation period of said periodic graduation; and said at least one scanning elements have at least one track comprised of N sub-elements, which are offset from one another in a measurement direction within a graduation period of the scanning graduation and whose effective widths $b_i$ (i=1 to N) within the graduation period are matched to their position within the graduation period so that the Fourier coefficients of the transmission function associated with the harmonics to be suppressed are minimized.

2. The device according to claim 1, wherein each of said N sub-elements is rectangular.

3. The device according to claim 1, wherein within a graduation period, said N sub-elements are offset equidistantly from one another in said measurement direction, wherein the effective widths $b_i$ of said N sub-elements correspond to a fraction of a graduation period and, depending on their position within the graduation period, are determined in accordance with a sine or cosine function.

4. The device according to claim 2, wherein within a graduation period, said N sub-elements are offset equidistantly from one another in said measurement direction, wherein the effective widths $b_i$ of said N sub-elements correspond to a fraction of the graduation period and, depending on their position within the graduation period, are determined in accordance with a sine or cosine function.

5. The device according to claim 1, wherein the lengths $l_i$ of said N sub-elements perpendicular to said measurement direction correspond to at least the width of a track of said scanning graduation.

6. The device according to claim 5, wherein the lengths $l_i$ have the same value.

7. The device according to claim 2, wherein the lengths $l_i$ of said N sub-elements perpendicular to said measurement direction correspond to at least the width of a track of said scanning graduation.

8. The device according to claim 7, wherein the lengths $l_i$ have the same value.

9. The device according to claim 3, wherein said N sub-elements within a graduation period P are disposed in relation to one another with a spacing a=P/2N and the widths $b_i$ of the sub-elements are variously chosen as a function of $b_i = a * \sin(i * 180°/N - 90°/N)$.

10. The device according to claim 4, wherein said N sub-elements within a graduation period P are disposed in relation to one another with a spacing a=P/2N and the widths $b_i$ of the sub-elements are variously chosen as a function of $b_i = a * \sin(i * 180°/N - 90°/N)$.

11. The device according to claim 1, wherein said scanning graduation comprises four scanning elements disposed in said measurement direction and supply phase-shifted output signals when scanning said periodic graduation.

12. The device according to claim 2, wherein said scanning graduation comprises four scanning elements disposed in said measurement direction and supply phase-shifted output signals when scanning said periodic graduation.

13. The device according to claim 1, further comprising:

a first photodetector and a second photodetector associated with said scanning element, wherein said first photodetector is connected in antiparallel to said second photodetector;

wherein said first photodetector produces a first output signal when said periodic graduation is scanned by said scanning graduation; and wherein said second photodetector produces a second output signal when said periodic graduation is scanned by said scanning graduation, where said first and second output signals are phase-shifted by 90° relative to one another.

14. The device according to claim 11, each of said four scanning elements further comprising:

a first photodetector and a second photodetector associated with said scanning element, wherein said first photodetector is connected in antiparallel to said second photodetector;

wherein said first photodetector produces a first output signal when said periodic graduation is scanned by said scanning graduation; and wherein said second photodetector produces a second output signal when said periodic graduation is scanned by said scanning graduation, where said first and second output signals are phase-shifted by 90° relative to one another.

15. A position measuring device for obtaining a position measurement value, said device comprising:

a light source producing a light flux;

a scale comprising a first graduation that receives said light flux and allows said light flux to pass therethrough;

a scanning unit comprising a second graduation that receives said light flux passing through said first graduation of said scale and allows said received light flux to pass therethrough, wherein said scanning unit moves relative to said scale along a measurement direction;

a photodetector to receive said light flux passing through said second graduation and producing a signal therefrom representative of the position measurement value;

wherein said second graduation comprises a particular transmission function which generates a filtering function when scanning said first graduation, wherein said transmission function is determined by a quantity of harmonics to be suppressed in said signals;

said second graduation comprising at least one scanning element for scanning a graduation period of said first graduation; and said at least one scanning elements have at least one track comprised of N sub-elements, which are offset from one another in a measurement direction within a graduation period of the second graduation and whose effective widths $b_i$ (i=1 to N) within the graduation period are matched to their position within the graduation period so that the Fourier coefficients of the transmission function associated with the harmonics to be suppressed are minimized.

16. The position measuring device of claim 15, wherein said first graduation is periodic.

17. The position measuring device according to claim 15, wherein each of said N sub-elements is rectangular.

18. The position measuring device according to claim 15, wherein within a graduation period, said N sub-elements are offset equidistantly from one another in said measurement direction, wherein the effective widths $b_i$ of said N sub-elements correspond to a fraction of a graduation period and, depending on their position within the graduation period, are determined in accordance with a sine or cosine function.

19. The position measuring device according to claim 15, wherein the lengths $l_i$ of said N sub-elements perpendicular to said measurement direction correspond to at least the width of a track of said second graduation.

20. The position measuring device according to claim 19, wherein the lengths $l_i$ have the same value.

21. The position measuring device according to claim 18, wherein said N sub-elements within a graduation period P are disposed in relation to one another with a spacing a=P/2N and the widths $b_i$ of the sub-elements are variously chosen as a function of $b_i$=a * sin (i * 180°/N−90°/N).

22. The position measuring device according to claim 15, wherein said second graduation comprises four scanning elements disposed in said measurement direction and supplying phase-shifted output signals when scanning said first graduation.

23. The position measuring device according to claim 15, further comprising:

a first photodetector and a second photodetector associated with said scanning element, wherein said first photodetector is connected in antiparallel to said second photodetector;

wherein said first photodetector produces a first output signal when said periodic graduation is scanned by said second graduation; and wherein said second photodetector produces a second output signal when said periodic graduation is scanned by said second graduation, where said first and second output signals are phase-shifted by 90° relative to one another.

24. A scanning graduation that scans a scale along a measuring direction to produce a signal representative of a position measurement value, said scanning graduation comprising:

a particular transmission function which generates a filtering function when scanning said scale, wherein said transmission function is determined by a quantity of harmonics to be suppressed in said signal;

said second graduation comprising at least one scanning element for scanning a graduation period of said first graduation; and said at least one scanning elements have at least one track comprised of N sub-elements, which are offset from one another in a measurement direction within a graduation period of the scanning graduation and whose effective widths $b_i$ (i=1 to N) within the graduation period are matched to their position within the graduation period so that the Fourier coefficients of the transmission function associated with the harmonics to be suppressed are minimized.

25. The scanning graduation according to claim 24, wherein each of said N sub-elements is rectangular.

26. The scanning graduation according to claim 24, wherein within a graduation period, said N sub-elements are offset equidistantly from one another in said measurement direction, wherein the effective widths $b_i$ of said N sub-elements correspond to a fraction of a graduation period and, depending on their position within the graduation period, are determined in accordance with a sine or cosine function.

27. The scanning graduation according to claim 24, wherein the lengths $l_i$ of said N sub-elements perpendicular to said measurement direction correspond to at least the width of a track of said scanning graduation.

28. The scanning graduation according to claim 27, wherein the lengths $l_i$ have the same value.

29. The scanning graduation according to claim 27, wherein said N sub-elements within a graduation period P are disposed in relation to one another with a spacing a=P/2N and the widths $b_i$ of the sub-elements are variously chosen as a function of $b_i$=a * sin (i * 180°/N−90°/N).

30. The scanning graduation according to claim 24, further comprising:

a first photodetector and a second photodetector associated with said scanning element, wherein said first photodetector is connected in antiparallel to said second photodetector.

* * * * *